United States Patent [19]

Sato et al.

[11] Patent Number: 5,708,485
[45] Date of Patent: Jan. 13, 1998

[54] ACTIVE MATRIX DISPLAY DEVICE

[75] Inventors: Takusei Sato; Yoshihiro Hashimoto; Kazuyoshi Yoshida; Shingo Makimura, all of Kanagawa; Makoto Takatoku, Kagoshima, all of Japan

[73] Assignee: Sony Corporation, Tokyo, Japan

[21] Appl. No.: 617,299

[22] Filed: Mar. 18, 1996

[30] Foreign Application Priority Data

Mar. 29, 1995 [JP] Japan .................... 7-087558

[51] Int. Cl.⁶ .................... G02F 1/1343; G02F 1/1333
[52] U.S. Cl. .................... 349/42; 349/44; 349/110; 349/111
[58] Field of Search .................... 359/59, 67; 349/42, 349/44, 110, 111

[56] References Cited

U.S. PATENT DOCUMENTS

| | | | |
|---|---|---|---|
| 4,759,610 | 7/1988 | Yanagisawa | 350/334 |
| 5,327,001 | 7/1994 | Wakai et al. | 257/350 |
| 5,414,547 | 5/1995 | Matsuo et al. | 359/67 |
| 5,517,341 | 5/1996 | Kim et al. | 359/59 |

*Primary Examiner*—William L. Sikes
*Assistant Examiner*—Julie Ngo
*Attorney, Agent, or Firm*—Hill, Steadman & Simpson

[57] ABSTRACT

To give an electric shield function and an electric contact function to a light shielding film formed on a drive substrate.

An active matrix display device includes a drive substrate 1 having pixels 4, an opposed substrate 2 having an opposed electrode 5, and a liquid crystal 3 held in a space defined between the drive substrate 1 and the opposed substrate 2. An upper layer portion of the drive substrate 1 includes pixel electrodes 6 formed individually for the pixels 4. A lower layer portion of the drive substrate 1 includes thin-film transistors 7 for individually driving the pixel electrodes 6, scanning lines 8, and signal lines 9. A light shielding film having conductivity is interposed between the upper layer portion and the lower layer portion, and is divided into mask shielding films 16M and pad shielding films 16P. Each mask shielding film 16M is continuously patterned along each row of the pixels 4 to partially shield at least the corresponding thin-film transistor 7. Each mask shielding film 16M is insulated from both the upper layer portion and the lower layer portion, and is maintained at a fixed potential. The pad shielding films 16P are discretely patterned for the individual pixels 4, and each pad shielding film 16P is located at a contact portion C between the corresponding pixel electrode 6 and the corresponding thin-film transistor 7 to provide electrical connection therebetween and light shielding.

26 Claims, 2 Drawing Sheets

ACTIVE MATRIX DISPLAY DEVICE

BACKGROUND OF THE INVENTION

The present invention generally relates to an active matrix display device comprising a matrix array substrate, an opposed substrate, and a liquid crystal held between the matrix array substrate and the opposed substrate. More particularly, the present invention relates to an active matrix display device having an on-chip black structure in which pixel electrodes, switching elements, and a light shielding black matrix are formed on the matrix array substrate.

Liquid crystal display devices are now widely used for television, graphic displays, etc. In particular, an active matrix liquid crystal display device has high-speed responsiveness and is suitable for presentation of a large number of pixels. These devices are expected to realize high image quality, a large size, and provide a color image capable screen. Certain active matrix display devices have already been put to practical use after research and development. In such existing active matrix display devices, scanning lines and signal lines which intersect each other at right angles are located on a drive substrate. A switching element and a pixel electrode are provided at the intersection of each scanning line and each signal line. An opposed electrode and a black matrix are typically formed on an opposed substrate. The black matrix shields external light which is incident on the switching elements to prevent malfunction of the switching elements as a result of photocurrent. The black matrix also shields leakage light passing through a gap between the pixel electrodes to prevent a reduction in contrast ratio. However, locating the black matrix on the opposed substrate requires precise alignment with the elements on the drive substrate. This is a difficult step in the assembly process. In order to prevent misalignment between the black matrix on the opposed substrate and the elements on the drive substrate, there exists a known method wherein the black matrix is provided so as to overlap the individual pixel electrodes to some extent. By this method, the misalignment occurring in joining the drive substrate and the opposed substrate can be absorbed up to the dimension of an overlapped portion. However, the use of such an overlapped portion reduces the open area of the black matrix with respect to the pixel electrodes and sacrifices the aperture ratio. This reduces the luminance of the pixels.

There presently exists a problem of misalignment occurring during manufacturing in combining the drive substrate and the opposed substrate when the black matrix is provided on the opposed substrate. It has been proposed to use a so-called on-chip black structure which is obtained by fabricating the black matrix on the drive substrate. This solution provides a positioning accuracy of about 1 μm between the pixel electrodes and the black matrix on the same substrate. Such a structure has been proposed in Japanese Laid-open Patent No. 5-181159, for example.

This structure will now be described with reference to FIG. 3. Referring to FIG. 3, this structure employs an insulating substrate 100 as a base which may be formed of quartz, for example. On the insulating substrate 100, there are layered in sequence from the lower side a semiconductor thin film 101 of polysilicon or the like, a gate insulating film 102, a gate electrode 103 of polysilicon reduced in resistance, an interlayer insulating film 104, a signal line 105 having a two-layer structure composed of an aluminum layer and a chromium layer, an interlayer insulating film 106 of SiNx, a light shielding film 107 of metal such as titanium or tungsten, or silicide thereof, a passivation film 108 of SiNx, and a pixel electrode 109 formed from a transparent conductive film of ITO or the like.

The signal line 105 is electrically connected to a source region 111 of the thin-film transistor 110, and the pixel electrode 109 is electrically connected to a drain region 112 of the thin-film transistor 110.

In this structure, the thin-film transistor 110 and the signal line 105 form a lower layer portion, and the pixel electrode 109 forms an upper layer portion. The light shielding film 107 is interposed between the upper layer portion and the lower layer portion to form a black matrix. The black matrix is formed from a metal film or the like, and is electrically insulated from both the upper layer portion and the lower layer portion by the interlayer insulating films. However, the light shielding film 107 generates a parasitic capacitance between it and the pixel electrode 109 of the upper layer portion and between it and the signal line 105 of the lower layer portion. The light shielding film 107 is in a stray potential state, so that capacitive coupling causes deterioration in display quality. Additionally, the pixel electrode 109 of the upper layer portion is electrically connected through the light shielding film 107 of an intermediate layer portion to the drain region 112 of the thin-film transistor 110 in the lower layer portion. At this contact portion, the light shielding film 107 is partially removed, so that perfect light shielding is difficult to achieve and partial light leakage occurs. Further, because the pixel electrode 109 which is formed of ITO or the like and the drain region 112 are in direct contact with each other, a good ohmic contact cannot be achieved which results in a pixel defect.

While the above structure is such that the light shielding film is provided between the upper layer portion and the lower layer portion, there has been also proposed another structure such that a light shielding film is formed as the lowermost layer. This structure is disclosed in Japanese Laid-open Patent No. 4-331923, for example. This structure employs a thin-film transistor of amorphous silicon as a switching element, which is now commonplace. In this structure, however, the thin-film transistor is formed after forming the light shielding film. Accordingly, there is a possibility of interlayer short-circuit and variations in characteristics of the thin-film transistor. To prevent this problem from occurring, the light shielding film must be partially removed which makes it difficult to achieve perfect light shielding. Further, in the case where a thin-film transistor of polysilicon is used as a switching element, a high-temperature process after forming the light shielding film is required. Accordingly, the structure wherein light shielding film is formed as the lowermost layer is not practical.

Further, there has also been proposed another structure such that a light shielding film is formed as the uppermost layer. However, because the pixel electrode is present on the surface of the drive substrate, it is difficult to ensure sufficient space between the pixel electrode and the light shielding film. When an inverted staggered structure is adopted for the thin-film transistor, the pixel electrode in the lower layer becomes exposed. Further, in a coplanar structure of the polysilicon thin-film transistor, the pixel electrode becomes exposed. As an improvement of such structures, there has also been proposed a structure such that a light shielding film is formed after forming the thin-film transistor and before forming the pixel electrode. In this structure, the pixel electrode and the light shielding film are electrically connected. However, this structure has a problem in that a potential of the pixel electrode is largely varied due to coupling. To prevent this problem, the light shielding film must be partially removed which causes imperfect light shielding.

SUMMARY OF THE INVENTION

It is a first object of the present invention to provide an active matrix display device having an on-chip black structure which provides substantially perfect light shielding. It is another object of the present invention to provide an active matrix display device which eliminates adverse effects of capacitive coupling, while providing a good electrical connection between each pixel electrode and the corresponding switching element. Other objects and advantages will be apparent from the following summary and detailed description of the preferred embodiments.

The active matrix display device according to the present invention basically includes a drive substrate having a matrix of pixels, an opposed substrate having an opposed electrode joined to the drive substrate with a space defined therebetween. An electro-optical material is held in a defined space located therebetween. The drive substrate comprises an upper layer portion having pixel electrodes individually formed thereon; a lower layer portion having switching elements for individually driving the pixel electrodes; scanning lines for scanning each row of the switching elements corresponding to each row of the pixels; and signal lines for supplying a given image signal to each column of the switching elements corresponding to each column of the pixels. A light shielding film is interposed between the upper layer portion and the lower layer portion. The light shielding film is conductive and divided into mask regions and pad regions. The light shielding film (mask shielding film) formed in each of the mask regions is continuously patterned along each row of the pixels and partially shields at least each switching element. Each mask shielding film is insulated from both the upper layer portion and the lower layer portion, and is maintained at a fixed potential. On the other hand, the light shielding films (pad shielding films) formed in the pad regions are discretely patterned for the individual pixels. Each pad shielding film is located at a contact portion between the corresponding pixel electrode and the corresponding switching element to provide electrical connection therebetween and light shielding.

Preferably, the mask shielding films are patterned to be parallel to the scanning lines and intersect the signal lines which shield light to form a lattice-shaped black matrix, thereby shielding the surrounding of each pixel electrode to define an opening of each pixel. More preferably, each mask shielding film has a notch pattern at an intersecting position with respect to each signal line. This reduces the area of overlap between each mask shielding film and each signal line. Preferably, each switching element has a leading electrode formed in the same layer as each signal line. The leading electrode may be electrically connected through the corresponding pad shielding film to the corresponding pixel electrode, and shields light in a region between the corresponding pad shielding film and the corresponding mask shielding film. Each mask shielding film may be maintained at a fixed potential which is equal to a potential of the opposed electrode. Further, each light shielding film may be a conductive metal film. Each switching element may be a thin-film transistor.

According to the present invention, a light shielding film is interposed between an upper layer portion having pixel electrodes formed therein and a lower layer portion having a plurality of thin-film transistors and lines. The light shielding film is electrically insulated from both the upper layer portion and the lower layer portion by interlayer insulating films. The light shielding film is divided into mask shielding films and pad shielding films. Each mask shielding film is maintained at a fixed potential which is equal to a potential of the opposed electrode. This, for example, allows it to act as an electric shield for each pixel electrode which suppresses the capacitive coupling with each line. Each pad shielding film is located at the contact portion between the corresponding pixel electrode and the corresponding switching element to provide a good electrical connection therebetween. More specifically, the leading electrode directly connected to the corresponding switching element is formed so as to be connected through the corresponding pad shielding film to the corresponding pixel electrode. The leading electrode is patterned so as to be aligned with space between the corresponding mask shielding film and the corresponding pad shielding film. This provides a perfect light shielding structure. The mask shielding films are patterned along the rows of the pixels, and the signal lines are patterned along the columns of the pixels. Thus, the mask shielding films and the signal lines which intersect each other at right angles are assembled to form a lattice-shaped black matrix on the drive substrate. Accordingly, a perfect on-chip black matrix structure is obtained.

DETAILED DESCRIPTION OF THE PREFERRED EMBODIMENTS

Figure 1:
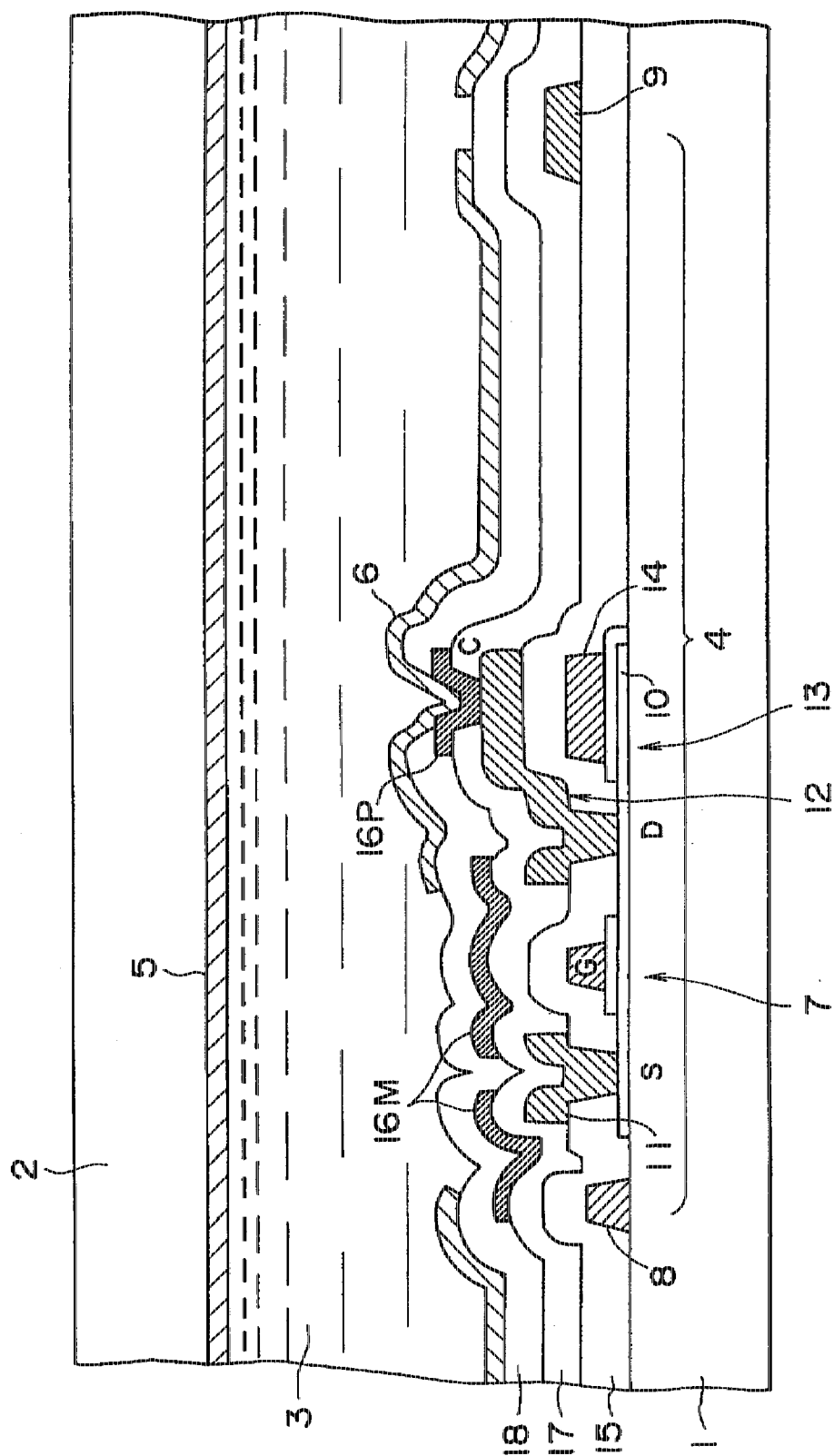
FIG. 1 is a schematic, fragmentary sectional view which illustrates a preferred embodiment of the active matrix display device according to the present invention.

A preferred embodiment of the present invention will now be described in detail with reference to the drawings. FIG. 1 is a schematic, fragmentary sectional view showing a preferred embodiment of the active matrix display device according to the present invention. As shown in FIG. 1, the active matrix display device has a panel structure which is comprised of a matrix array substrate 1, an opposed substrate 2. An electro-optical material such as a liquid crystal 3 is held between the matrix array substrate 1 and the opposed substrate 2. The matrix array substrate 1 has a matrix of pixels 4. The opposed substrate 2 has at least an opposed electrode 5, and is joined to the matrix array substrate 1 with a given space defined therebetween. The liquid crystal 3 is held in this defined space.

The drive substrate 1 is divided into an upper layer portion, an intermediate layer portion, and a lower layer portion. The upper layer portion includes pixel electrodes 6 formed corresponding to the pixels 4. The lower layer portion includes thin-film transistors 7 as switching elements for individually driving the pixel electrodes 6, scanning lines 8, each for scanning each row of the thin-film transistor 7 corresponding to each row of the pixels 4, and signal lines 9 each for supplying a given image signal to each column of the thin-film transistors 7 corresponding to each column of the pixels 4. Each thin-film transistor 7 has a semiconductor thin film 10 as an active layer formed of polysilicon or the like, and a gate electrode G patterned over the semiconductor thin film 10 with a gate insulating film interposed therebetween. The gate electrode G is continued to the corresponding scanning line 8. Each thin-film transistor 7 has a source region S and a drain region D on respective sides of the gate electrode G. A leading electrode 11 is connected to the source region S, and is continued to the corresponding signal line 9. Another leading electrode 12 is connected to the drain region D. A storage capacitor 13 is also formed in the semiconductor thin film 10 in addition to the thin-film transistor 7. The storage capacitor 13 has an electrode by the semiconductor thin film 10 and another electrode by an auxiliary line 14. A dielectric film is interposed between the two electrodes 10 and 14 so as to be formed by the same layer as the gate insulating film. The gate electrodes G, the scanning lines 8, and the auxiliary lines 14 are formed by the same layer, and are electrically insulated from the leading electrodes 11 and 12 by a first interlayer insulating film 15.

The intermediate layer portion between the upper layer portion and the lower layer portion is formed as a conductive light shielding film. The light shielding film is divided into mask regions and pad regions. That is, the light shielding film is divided into mask shielding films 16M and pad shielding films 16P. These conductive light shielding films 16M and 16P are formed from a metal film. Each of the mask shielding films 16M is continuously patterned along each row of the pixels 4, and partially shields at least each thin-film transistor 7. Each mask shielding film 16M is sandwiched between a lower, or second interlayer insulating film 17 and an upper, or third interlayer insulating film 18, thus being insulated from both the lower layer portion and the upper layer portion. Each mask shielding film 16M is maintained at a fixed potential. This fixed potential is set equal to the potential of the opposed electrode 5, for example. On the other hand, the pad shielding films 16P are discretely patterned for the individual pixels 4. Each of the pad shielding films 16P is located at a contact portion C between the corresponding pixel electrode 6 and the corresponding thin-film transistor 7 to perform electrical connection therebetween and light shielding at the contact portion C. More specifically, each pad shielding film 16P is interposed between the corresponding pixel electrode 6 and the corresponding leading electrode 12 to provide good electrical connection therebetween. The leading electrode 12 is formed by the same layer as each signal line 9 as mentioned above, and is directly connected to the drain region D of the corresponding thin-film transistor 7. The leading electrode 12 light shields a region between the pad shielding film 16P and the mask shielding film 16M separated from each other.

Figure 2:
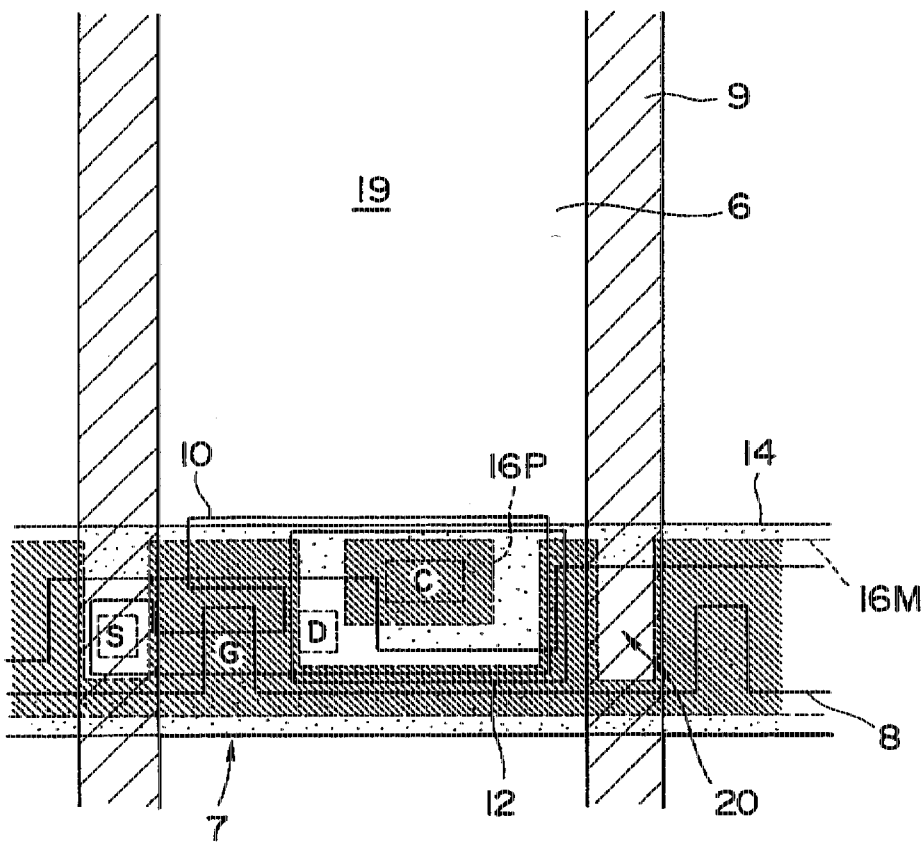
FIG. 2 is a schematic, fragmentary plan view which illustrates the preferred embodiment of the active matrix display device according to the present invention.
Figure 3:
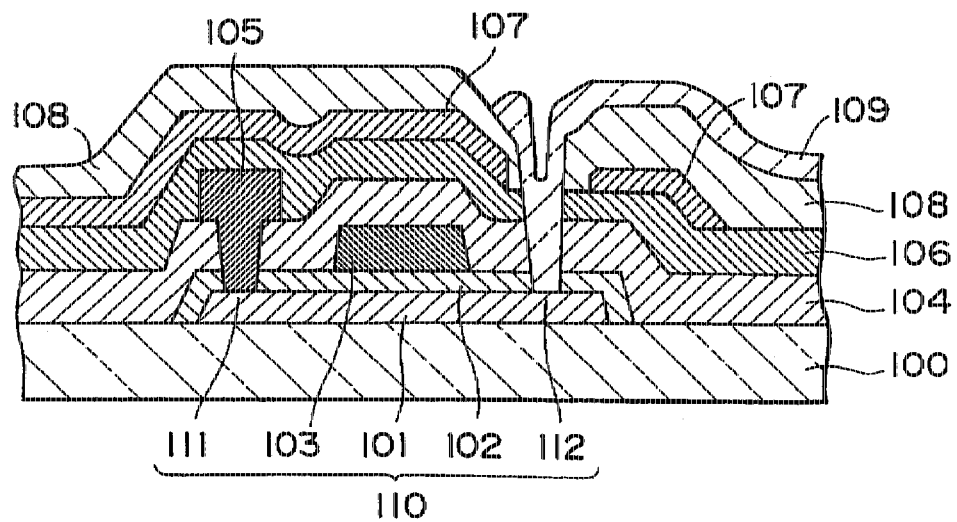
FIG. 3 is a schematic, fragmentary sectional view which illustrates an active matrix display device.

FIG. 2 is a schematic plan view of the active matrix display device shown in FIG. 1, which illustrates an enlarged view of one pixel portion. As shown in FIG. 2, each mask shielding film 16M is patterned in parallel to the scanning lines 8. Accordingly, each mask shielding film 16M intersects the signal lines 9 having light shieldability to form a lattice-shaped black matrix. With this structure, the surrounding portion of each pixel electrode 6 is light-shielded to define an opening 19 of each pixel 4. Each mask shielding film 16M has a notch pattern 20 at the intersection with each signal line 9, so as to make the overlapping area between the mask shielding film 16M and the signal line 9 as small as possible, thereby suppressing the adverse effects of capacitive coupling. At the notch pattern 20, the overlapping width between the mask shielding film 16M and the signal line 9 is merely about 0.1 to 2.0 μm. As mentioned above, each thin-film transistor 7 has the leading electrode 12 formed by the same layer as the signal line 9, and the leading electrode 12 is in direct contact with the drain region D. The leading electrode 12 is electrically connected through the corresponding pad shielding film 16P to the corresponding pixel electrode 6. In other words, each pad shielding film 16P is located at the contact portion C between the corresponding pixel electrode 6 and the corresponding thin-film transistor 7. The leading electrode 12 shields the region between the pad shielding film 16P and the mask shielding film 16M. The auxiliary line 14 shown in FIG. 1 is patterned in parallel to the scanning line 8. The auxiliary line 14 partially overlaps the semiconductor thin film 10 to form the auxiliary capacitor 13 mentioned above.

As described above, the conductive light shielding films 16M and 16P are formed over the switching elements comprising the thin-film transistors 7, for example, the signal lines 9, the scanning lines 8, etc., and under the pixel electrodes 6. These light shielding films 16M and 16P are insulated from all of the signal lines 9, the scanning lines 8, and the pixel electrodes 6, thereby shielding all regions to be masked with a minimum area. Accordingly, perfect light shielding of a display region can be effected only by the drive substrate 1, and the transmissivity of the active matrix display device can be improved to the maximum. Further, only the opposed electrode 5 must be formed on the opposed substrate 2, therefore the cost of materials and assembly can be reduced. In addition, because each mask shielding film 16M is maintained at a fixed potential, it can act as an electric shield for each pixel electrode 6 and can suppress capacitive coupling, thereby improving display quality. On the other hand, each pad shielding film 16P is interposed between the corresponding pixel electrode 6 and the corresponding leading electrode 12 to make a good electrical connection therebetween.

A method of manufacturing the active matrix display device according to the present invention will now be described with reference to FIGS. 1 and 2. The drive substrate 1 is formed of glass, quartz, etc. The semiconductor thin film 10 is formed on the drive substrate 1 by low-pressure CVD. For example, the semiconductor thin film 10 is formed as a deposited film of polysilicon having a thickness of about 50 nm, and it is used as an active layer of the thin-film transistor 7. After film formation, the semiconductor thin film 10 is patterned to form islands. Then, a gate insulating film of $SiO_2$, for example, is formed on the semiconductor thin film 10. The semiconductor thin film 10 may be formed of amorphous silicon or the like rather than polysilicon. The gate insulating film may be formed of SiN, tantalum oxide or laminated films of these substances, rather than $SiO_2$.

Then, the scanning lines 8, the gate electrodes G, and the auxiliary lines 14 are simultaneously formed on the drive substrate. For example, these elements are formed by depositing polysilicon to a thickness of about 350 nm by low-pressure CVD. Next the polysilicon film is doped with an impurity to reduce a resistance. Finally the polysilicon film is patterned into a desired shape. The scanning lines 8, the gate electrodes G, and the auxiliary lines 14 may be formed of a metal such as Ta, Mo, Al, or Cr, in a silicide thereof, or polycide thereof rather than polysilicon. In this manner, the thin-film transistors 7 each comprised of the semiconductor thin film 10, the gate insulating film, and the gate electrode G, are formed. In this preferred embodiment, each thin-film transistor 7 is of a planar type; however, a normal staggered type or an inverted staggered type may also be adopted. At the same time, the storage capacitor 13 is also formed in each semiconductor thin film 10.

Then, the first interlayer insulating film 15 is formed by depositing PSG or the like to a thickness of about 600 nm by atmospheric-pressure CVD. The first interlayer insulating film 15 covers the scanning lines 8, the gate electrodes G, and the auxiliary lines 14 mentioned above. Contact holes reaching the source region S and the drain region D of each thin-film transistor 7 are opened through the first interlayer insulating film 15. The signal lines 9 and the leading electrodes 11 and 12 are formed on the first interlayer insulating film 15 by, for example, depositing aluminum to a thickness of about 600 nm by sputtering, and then patterning the aluminum film into a desired shape. The leading electrode 11 is connected through the contact hole of the insulating film 15 to the source region S of each thin-film transistor 7. The other leading electrode 12 is similarly connected through the other contact hole of the insulating film 15 to the drain region D of each thin-film transistor 7. The signal lines 9 and the leading electrodes 11 and 12 may be formed of Ta, Cr, Mo, Ni, etc. rather than Al.

The second interlayer insulating film 17 is formed on the signal lines 9 and the leading electrodes 11 and 12 so as to cover these elements. For example, the second interlayer insulating film 17 is formed by depositing PSG to a thickness of about 600 nm by atmospheric-pressure CVD. A contact hole (C) reaching the leading electrode 12 is opened through the second interlayer insulating film 17. The mask shielding films 16M and the pad shielding films 16P are then formed on the second interlayer insulating film 17 by, for example, depositing Ti to a thickness of about 250 nm by sputtering and then patterning the Ti film into a desired shape. Each mask shielding film 16M is in contact with a fixed potential in a region outside the display pixel. On the other hand, each pad shielding film 16P is in contact with the leading electrode 12 through the contact hole (C). The mask shielding films 16M are connected together over the whole display pixel region. The mask shielding films 16M cover almost the whole region of the thin-film transistors 7, the scanning lines 8, and the auxiliary lines 14 except the pixel openings 19 and the signal lines 9. Accordingly, a pair of opposed sides of each pixel opening 19 are defined by the adjacent signal lines 9, and the other pair of sides of each pixel opening 19 are defined by the adjacent mask shielding films 16M. The mask shielding films 16M may be formed of any materials having sufficient light shielding qualities and good step coverage. The light shielding ability of the mask shielding films 16M required is that the transmissivity not be greater than 1%. Preferably the transmissivity is not greater than 0.1% in the visible region of 400 to 700 nm. The mask shielding films 16M may be formed of metal such as Cr, Ni, Ta, W, Al, Cu, Mo, Pt, or Pd, as an alloy thereof, or a silicide thereof rather than Ti. The thickness of each mask shielding film 16M which is required is a thickness satisfying the above-mentioned light shielding ability with every material mentioned above, and in general, the required thickness is not less than 50 nm. The pad insulating films 16P are formed by the same layer as the mask shielding films 16M.

Then, the third interlayer insulating film 18 is formed to cover the mask shielding films 16M and the pad shielding films 16P. For example, the third interlayer insulating film 18 is formed by depositing PSG to a thickness of about 600 nm by atmospheric-pressure CVD. A contact hole reading each pad shielding film 16P is opened through the third interlayer insulating film 18. The interlayer insulating films 15, 17, and 18 may be formed of any transparent and insulating materials such as SIO2, BSG, BPSG, SiN, plasma SiN, in addition to PSG, or organic substances such as polyamide and acrylic resin. Then, the pixel electrodes 6 are formed on the third interlayer insulating film 18 by, for example, depositing a transparent conductive film of ITC or the like to a thickness of about 150 nm by sputtering, and then patterning the transparent conductive film into a desired shape.

Thereafter, the opposed substrate 2 formed of glass or the like and having the opposed electrode 5 formed over the whole surface is joined to the drive substrate 1. Finally, the liquid crystal 3 is sealed into the space defined between the drive substrate 1 and the opposed substrate 2. The liquid crystal 3 is oriented in a twisted nematic mode.

While the thin-film transistor 7 is used as the switching element in the above preferred embodiment, a two-terminal element such as a diode, varistor, or a metal-insulator-metal (MIM) element may be used as the switching element in place of a three-terminal element such as a thin-film transistor. In the case where such a two-terminal element is used, a plurality of matrix pixel electrodes, two-terminal elements, a first electrode group, etc. are provided on the drive substrate 1, and a second electrode group intersecting the first electrode group is provided on the opposed substrate 2. In the above preferred embodiment, the pixel electrodes 6 are connected to the drain regions D of the thin-film transistors 7, and the signal lines 9 are connected to the source regions S of the thin-film transistors 7. However, because the liquid crystal 3 is actually driven by alternating current, the roles of the source region S and the drain region D of each thin-film transistor 7 are alternately exchanged.

As described above, according to the present invention, the light shielding film is interposed between the upper layer portion having the pixel electrodes and the lower layer portion having the thin-film transistors and the lines. The light shielding film is divided into mask shielding films and the pad shielding films. Each mask shielding film is connected to a fixed potential, so that it can act as an electric shield for each pixel electrode and suppress capacitive coupling to each line, thereby improving a display quality. On the other hand, each pad shielding film is interposed between the corresponding pixel electrode and the corresponding switching element to make a good electrical connection therebetween. The mask shielding films are formed over the switching elements and the lines and under the pixel electrodes, and are insulated from both the lines and the pixel electrodes, so that all regions to be light-shielded can be shielded with a minimum area. Accordingly, perfect light shielding of a display region can be effected only by the drive substrate, and the transmissivity of the liquid crystal display device can be improved to the maximum level. On the other hand, only the opposed electrode must be formed on the opposed substrate 2, so that cost of materials and assembly can be reduced.

The present invention is subject to many variations, modifications and changes in detail. It is intended that all matter described throughout the specification and shown in the accompanying drawings be considered illustrative only. Accordingly, it is intended that the invention be limited only by the scope of the appended claims.

We claims as our invention:

1. An active matrix display device having a first substrate which has matrix array of pixels, a second substrate opposed to the first substrate and having an electrode, and an electro-optical material held between the first and second substrates; said first substrate comprising:

an upper layer portion having pixel electrodes, each of which is formed for the pixels;

a lower layer portion having switching elements each of which drives the pixel electrodes, scanning lines for scanning row of the switching elements corresponding to each row of the pixels, and signal lines for supplying a signal to column of the switching elements corresponding to column of the pixels; and a light shielding film interposed between the upper and lower layer portions, said light shielding film having conductivity and comprising a mask region and a pad region, said mask region being continuously patterned along the row of the pixels to shield at least the switching elements, being insulated from both the upper and lower layer potions, and being maintained at a potential, said pad region being isolated from the mask region and being located at a contact portion between the corresponding pixel electrode and the corresponding switching elements to provide electrical connection therebetween.

2. An active matrix display device as claimed in claim 1, wherein said signal lines are comprised of a black matrix in combination with the light shielding film.

3. An active matrix display device as claimed in claim 2, wherein said mask region of the light shielding film is patterned in parallel to the respective scanning lines to intersect the signal lines.

4. An active matrix display device as claimed in claim 3, wherein said light shielding film has a notch pattern at an intersecting position with respect to each of the signal lines to reduce an area of overlap between the light shielding film and the signal lines.

5. An active matrix display device as claimed in claim 1, wherein each of the switching elements has a leading electrode formed by the same layer as each signal line, said leading electrode is electrically connected through the pad region to the corresponding pixel electrode, and has light shieldability to shield a region between the pad region and the mask region.

6. An active matrix display device as claimed in claim 1, wherein said mask region is maintained at the potential which is equal to a potential of the electrode on the second substrate.

7. An active matrix display device as claimed in claim 1, wherein said light shielding film comprises a metal.

8. An active matrix display device as claimed in claim 1, wherein each of said switching elements comprises a thin-film transistor.

9. An active matrix array substrate comprising:
an upper layer portion having pixel electrodes arranged in a matrix;
a lower layer portion having switching elements each of which drives the corresponding pixel electrodes, a scanning line for scanning row of the switching elements, and signal lines for supplying a signal to column of the switching elements; and
a light shielding film interposed between the upper and lower layer portions, said light shielding film having conductivity and being divided into a mask region and a pad region, said mask region being continuously patterned along the row of the pixel electrodes, to shield at least the switching elements, being insulated from both the upper and lower layer portions, and being maintained at a potential, said pad region being discretely patterned for each of the pixels and being located at a contact portion between the corresponding pixel electrode and the corresponding switching element to provide electrical connection therebetween.

10. An active matrix array substrate as claimed in claim 9, wherein signal lines is comprised of a black matrix in combination with the light shielding film.

11. An active matrix array substrate as claimed in claim 10, wherein said mask region of the light shielding film is patterned in parallel to the respective scanning lines to intersect the signal lines.

12. An active matrix array substrate as claimed in claim 11, wherein said light shielding film has a notch pattern at an intersecting position with respect to each of the signal lines to reduce an area of overlap between the light shielding film and the signal lines.

13. An active matrix array substrate as claimed in claim 9, wherein each of the switching elements has a leading electrode formed by the same layer as each signal line, said lead electrode is electrically connected through the pad region to the corresponding pixel electrode, and has light shieldability to shield a region between the pad region and the mask region.

14. An active matrix array substrate as claimed in claim 9, wherein said light shielding film comprises a metal.

15. An active matrix array substrate as claimed in claim 9, wherein said each of said switching elements comprises a thin-film transistor.

16. A display device comprising:
a substrate;
an active layer formed on the substrate;
a gate electrode formed over a first portion of the active layer;
a capacitor formed at a second portion of the active layer;
a first conductive shielding film formed over the gate electrode;
a second conductive shielding film formed over the capacitor between a pixel electrode and a leading electrode which is connected to a drain region wherein the first conductive shielding film is maintained at a fixed potential.

17. The display device of claim 16, wherein the first shielding film is formed substantially perpendicular to a plurality of light shielding signal lines in intersecting relationship to form a black matrix.

18. The display device of claim 17, wherein the first light shielding film has a notch formed at an intersection with a signal line to reduce an area of overlap between the first light shielding film and the signal line.

19. The display device of claim 16, wherein the leading electrode is formed in a layer of a signal line and wherein the leading electrode shields light between the first and second conductive shielding films.

20. The display device of claim 16, wherein the first shielding film is maintained at an electric potential equal to a potential of the leading electrode.

21. An active matrix display device comprising:
a first substrate having a matrix array of pixels;
a second substrate opposed to the first substrate, having a counter electrode; and electro-optical material held between the first and second substrates said first substrate further comprising:
an upper portion having pixel electrodes, for each of the pixels;
a lower layer portion having switching elements each of which drives the pixel electrodes;
scanning lines for scanning a row of the switching elements corresponding to each row of pixels, and signal lines for supplying a signal to a column of the switching elements corresponding to a column of the pixels and being comprised of a black matrix to shield a column direction of the matrix; and
a light shielding film interposed between the upper and lower layer portions, said light shielding film having a mask region which is continuously patterned along the row of the pixels to shield at least the switching elements, and being insulated from both the upper and lower layer portions, said light shielding film comprised of the black matrix to shield a row direction of the matrix.

22. An active matrix display device according to claim 21, wherein said light shielding form has a notch pattern at an intersection of each of the signal lines to reduce an overlap between the light shielding film and the signal lines.

23. An active matrix display device according to claim 21, wherein said mask region is maintained at a potential equal to a potential of the counter electrode.

24. An active matrix display device according to claim 21, wherein said light shielding film comprises a metal.

25. An active matrix display device according to claim 21, wherein each of said switching elements comprises a thin-film transistor.

26. A display device comprising:

a substrate;

transistor on the substrate;

a first lead electrode connected to a source of the transistor;

a second lead electrode connected to a drain of the transistor;

a capacitor adjacent the drain formed over an active layer;

an insulating film formed on the source and drain electrodes;

at least one mask shielding film formed on the insulating layer at least partially covering the transistor;

a pad shielding film between the second lead electrode and the pixel electrode; and a notch in the mask shielding film at an intersection with a signal line and wherein the mask is maintained at a fixed potential.

* * * * *